US012450738B2

(12) United States Patent
Ng et al.

(10) Patent No.: US 12,450,738 B2
(45) Date of Patent: Oct. 21, 2025

(54) AUTOMATED MULTI-CLASS SEGMENTATION OF DIGITAL MAMMOGRAM

(71) Applicant: Real Time Tomography, LLC, Villanova, PA (US)

(72) Inventors: Susan Ng, Villanova, PA (US); Vincent Yun Dong, Philadelphia, PA (US); Tristan Douglas Maidment, Villanova, PA (US); Lucas Rodrigues Borges, Sao Paulo (BR); Katherine Martling Hopkins, Lancaster, PA (US); Johnny Kuo, Lancaster, PA (US); Albert Milani, Merion Station, PA (US); Peter A. Ringer, Allentown, PA (US)

(73) Assignee: REAL TIME TOMOGRAPHY, LLC, Villanova, PA (US)

( * ) Notice: Subject to any disclaimer, the term of this patent is extended or adjusted under 35 U.S.C. 154(b) by 413 days.

(21) Appl. No.: 18/062,712

(22) Filed: Dec. 7, 2022

(65) Prior Publication Data
US 2023/0177686 A1 Jun. 8, 2023

Related U.S. Application Data

(60) Provisional application No. 63/265,037, filed on Dec. 7, 2021.

(51) Int. Cl.
G06T 7/00 (2017.01)
A61B 6/00 (2006.01)
(Continued)

(52) U.S. Cl.
CPC ............ *G06T 7/0012* (2013.01); *A61B 6/502* (2013.01); *A61B 6/5235* (2013.01); *G06T 7/11* (2017.01);
(Continued)

(58) Field of Classification Search
CPC ......... G06T 7/0012; G06T 2207/20081; G06T 2207/30068; G06T 2207/20084; G06T 2207/30168; A61B 6/502
See application file for complete search history.

(56) References Cited

U.S. PATENT DOCUMENTS 8,233,690 B2 7/2012 Ng et al.
9,456,796 B2 10/2016 Han et al.
(Continued)

OTHER PUBLICATIONS

Naylor, S. M., & York, J. (1999). An evaluation of the use of pectoral muscle to nipple level as a component to assess the quality of the medio-lateral oblique mammogram. Radiography, 5(2), 107-110. (Year: 1999).*

(Continued)

*Primary Examiner* — Bobbak Safaipour
*Assistant Examiner* — Ashley L. Hytrek
(74) *Attorney, Agent, or Firm* — Fox Rothschild LLP

(57) ABSTRACT

This document describes methods and systems for training a machine learning model to segment digital breast images into key regions of interest, and also for using the model on a new digital breast image to assess whether the breast image exhibits adequate image quality, report the image quality, and/or to use these data to reconstruct or process the new breast image.

20 Claims, 6 Drawing Sheets

(51) Int. Cl.
*A61B 6/50* (2024.01)
*G06T 7/11* (2017.01)
(52) U.S. Cl.
CPC .............. *G06T 2207/20081* (2013.01); *G06T 2207/30068* (2013.01)

(56) References Cited

U.S. PATENT DOCUMENTS

| | | | |
|---|---|---|---|
| 9,743,891 | B2 | 8/2017 | Maidment et al. |
| 10,111,631 | B2 | 10/2018 | Gkanatsios et al. |
| 10,593,069 | B2 | 3/2020 | Ng et al. |
| 11,154,362 | B2 | 10/2021 | Kim et al. |
| 11,185,294 | B2 | 11/2021 | Maidment et al. |
| 2009/0297002 | A1* | 12/2009 | Zhang ............... G06T 7/181 382/128 |
| 2011/0013819 | A1* | 1/2011 | Raundahl ........... G06V 10/763 382/132 |
| 2011/0081099 | A1* | 4/2011 | Hughes .............. G01T 1/167 382/284 |
| 2014/0334680 | A1* | 11/2014 | Serlie ................. G06T 7/12 382/103 |
| 2014/0355840 | A1* | 12/2014 | Pearson Peyton .... A61B 6/563 382/115 |
| 2015/0221091 | A1 | 8/2015 | Sugiyama et al. |
| 2016/0302742 | A1 | 10/2016 | Maidment et al. |
| 2016/0314579 | A1 | 10/2016 | Ghouti et al. |
| 2016/0367210 | A1* | 12/2016 | Gkanatsios ......... G06T 11/60 |
| 2017/0245810 | A1* | 8/2017 | Maidment .......... A61B 6/54 |
| 2019/0287241 | A1* | 9/2019 | Hill .................... A61B 6/5282 |
| 2021/0174504 | A1* | 6/2021 | Madabhushi ....... G16H 30/40 |
| 2023/0071400 | A1* | 3/2023 | Abdolell ............. G16H 30/20 |

OTHER PUBLICATIONS

ACR. (1999). Mammography quality control manual. American College of Radiology. (Year: 1999).*

Kwok, S. M., Chandrasekhar, R. A., & Attikiouzel, Y. (Oct. 2004). Automatic assessment of mammographic positioning on the mediolateral oblique view. In 2004 International Conference on Image Processing, 2004. ICIP'04. (vol. 1, pp. 151-154). IEEE. (Year: 2004).*

Bentley, K., Poulos, A., & Rickard, M. (2008). Mammography image quality: analysis of evaluation criteria using pectoral muscle presentation. Radiography, 14(3), 189-194. (Year: 2008).*

ACR. (2018). Digital Mammography Quality Control Manual (2nd ed.). American College of Radiology. (Year: 2018).*

Sweeney, R. J. I., Lewis, S. J., Hogg, P., & McEntee, M. F. (2018). A review of mammographic positioning image quality criteria for the craniocaudal projection. The British journal of radiology, 91(1082), Jun. 11, 2017. (Year: 2018).*

Karnati, P. S. V. P. (2021). Automatic assessment of mammographic images: positioning and quality assessment (Doctoral dissertation, Massachusetts Institute of Technology). (Year: 2021).*

Kuo et al., Dynamic Reconstruction and Rendering of 3D Tomosynthesis Images, Proc. SPIE 7961, Medical Imaging 2011: Physics of Medical Imaging, 796116 (Mar. 16, 2011).

Wu et al., Digitial tomosynthesis mammography using a parallel maximum likelihood reconstruction method, Proceedings vol. 5368, Medical Imaging 2004: Physics of Medical Imaging; (2004).

Maghsoudi et al., Automatic breast segmentation in digital mammography using a convolutional neural network, Proc. SPIE 11513, 15th International Workshop on Breast Imaging (IWBI2020), 1151322 (May 22, 2020).

Ma et al., Automated Pectoral Muscle Identification on MLO-view Mammograms: Comparison of Deep Neural Network to Conventional Computer Vision, Med Phys. May 2019 ; 46(5): 2103-2114.

Ronneberger et al., U-Net: Convolutional Networks for Biomedical Image Segmentation, arXiv:1505.04597v1 (May 18, 2015).

Lauby-Secretan et al., Breast-Cancer Screening—Viewpoint of the IARC Working Group, N Engl J Med 372;24 (Jun. 11, 2015).

Taplin et al., Screening Mammography: Clinical Image Quality and the Risk of Interval Breast Cancer, AJR:178, 797-803, Apr. 2002.

Mojabi et al. "Tissue-Type Classification With Uncertainty Quantification of Microwave and Ultrasound Breast Imaging: A Deep Learning Approach", IEEE, 2020. Retrieved on Mar. 21, 2023. Retrieved from <URL: https://ieeexplore.ieee.org/document/9210075>.

International Search Report and Written Opinion for PCT/US2022/081089 dated Apr. 13, 2023, 30 pages.

* cited by examiner

AUTOMATED MULTI-CLASS SEGMENTATION OF DIGITAL MAMMOGRAM

RELATED APPLICATIONS AND CLAIM OF PRIORITY

This patent document claims priority to United States Provisional Patent Application No. 63/265,037, filed Dec. 7, 2021, the disclosure of which is fully incorporated into this document by reference.

BACKGROUND

Digital mammography is the gold standard in breast cancer screening for women, with the aim of reducing mortality of breast cancer through early disease detection. Other types of digital imaging also can be used in breast cancer imaging, including digital breast tomosynthesis (in which the breast is imaged in two or more projections that are reconstructed into a three-dimensional image), the generation of synthetic mammograms, contrast-enhanced mammography (CEM), computed tomography (CT), ultrasound (US), magnetic resonance imaging (MRI), and image-guided biopsy. To maximize the effectiveness of breast cancer screening, a high level of quality assurance of the acquired mammograms must be maintained. Breast positioning is an important factor that can affect the quality of a digital mammogram (DM) or other digital breast image. Poor breast positioning may require additional imaging, which can cause an associated radiation exposure increase. Poor breast positioning also can reduce the sensitivity of the DM, which may impair the ability to detect breast cancer in the image. In addition, for patients who have breast implants, poor breast positioning can result in an image in which it is difficult to distinguish a tumor because it may be hidden by the implant.

Therefore, methods that can improve the overall quality and sensitivity of the DM are desired. This document describes methods and systems that are directed to solving at least some of these issues.

SUMMARY

This document describes methods, systems, and computer program products for training a machine learning model to segment digital breast images into key regions of interest, and also for using the model on newly-captured images to perform an image quality assessment, for example, whether the breast is properly positioned in the images, and also to customize the image processing or the image reconstruction based on the image segmentation or the image quality assessment.

As disclosed in this document, to automatically analyze a digital breast image, a processor will receive an image of a breast and use a machine learning model to process the image to generate a breast mask for an entire region of the image in which the breast appears. The processor will also use the machine learning model to process the image to generate at least a second mask for a region of the image in which a feature other than the breast in its entirety appears. The processor will combine the breast mask and the second mask to yield a combined mask image.

In some embodiments, the processor may use the combined mask image to generate a measurement of quality of the received image, and the processor may generate and output a report that includes the measurement of quality. In other embodiments, the processor will use the combined mask image to generate a processed image that includes the combined mask image. In other embodiments, the processor will use the combined mask image to generate a reconstruction that includes the combined mask image.

The methods described above may be embodied in a system including a processor and memory containing programming instructions that, when executed, will cause the processor to implement the actions described above. Various embodiments also include a computer program product that contains such programming instructions, and a memory containing the computer program product.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, unless otherwise specified, the term "approximately" may include values that are within +/−10 percent of the number, in other embodiments specifically described below. The term "approximately" includes values that are within +/−25 percent of the stated number.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure will be defined at the end of this Detailed Description section.

Figure 1:
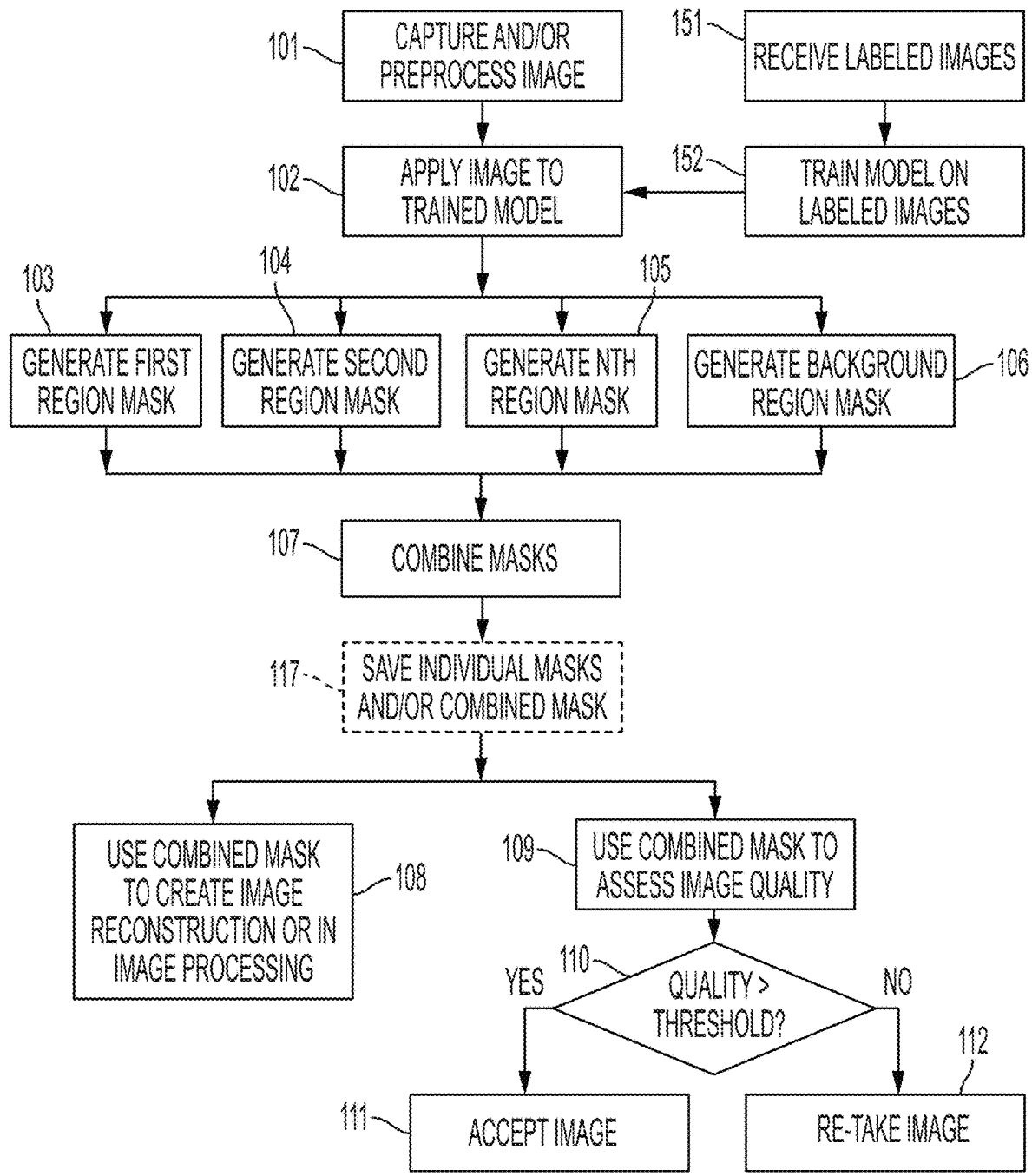
FIG. 1 illustrates example steps of model training, image segmentation, image quality assessment, and image processing or image reconstruction processes according to various embodiments

FIG. 1 illustrates example steps of model training, image segmentation, image quality assessment, and image processing or image reconstruction processes according to various embodiments. In the image segmentation process, at 101 a digital imaging system will capture a digital breast image. For example, a full-field digital mammography (FFDM) system may capture a digital mammogram (DM), which is a set of one or more digital mammographic images of a breast. In various embodiments, the image may contain a mediolateral oblique (MLO) view of the breast, although other views such as a craniocaudal (CC) view, mediolateral (ML) view, a lateromedial (LM) view, a lateromedial oblique (LMO) view, a magnification view, or other views may be captured. This disclosure will describe the image as being a two-dimensional (2D) digital mammogram by way of example. However, other types of digital images captured or generated in breast cancer imaging processes, such as images captured in contrast-enhanced mammography (CEM) systems, magnetic resonance imaging (MM) systems, ultrasound (US), synthetic mammogram generation systems, image-guided biopsy imaging systems, two-dimensional (2D) source projection images that are captured using projection X-ray imaging and/or used to reconstruct a three-dimensional (3D) tomosynthesis acquisition or a computed tomography (CT) image, and other types of digital images may be used in various embodiments.

Optionally, the imaging system or another processor may preprocess the image with an image preprocessing pipeline that standardizes the grey scale look, the resolution or noise properties, the orientation of each image, or other image properties that the system processes. For example, the system may orient each image such that the pectoralis would be located in the upper left region of the image (as illustrated in the example combined mask image 201 of FIG. 2). The system also may downsample some or all images to a coarser resolution, such as 384×384 pixels, using pixel averaging, decimation or another appropriate process. The system also may upsample some or all images to a finer resolution in some embodiments, using bilinear interpolation or another appropriate process. Upsampling an image appropriately is also known as super-resolution, examples of which are described in, for example, U.S. Pat. No. 11,361,479, the disclosure of which is incorporated into this document by reference.

Figure 2:
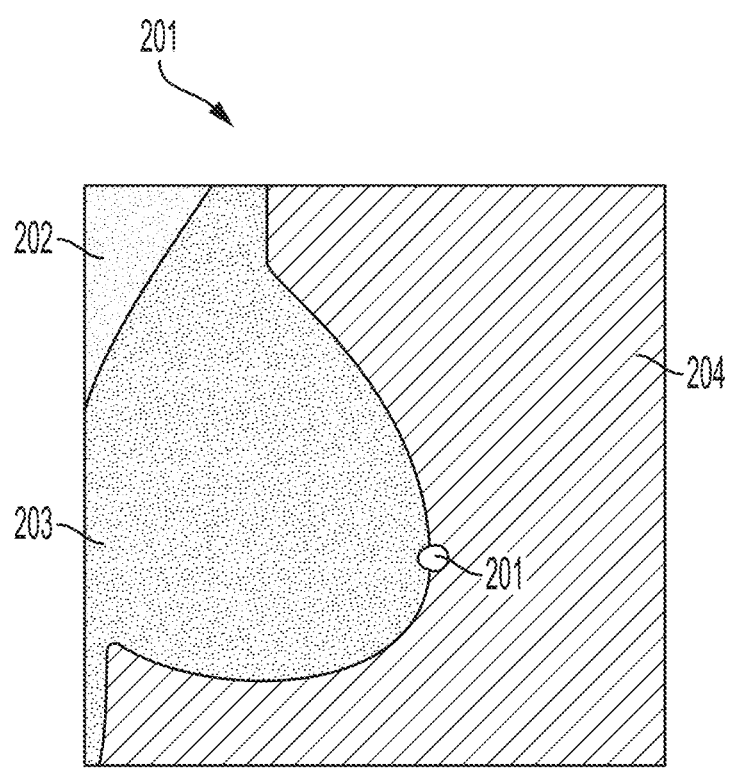
FIG. 2 illustrates an example combined mask image that has been processed using procedures of this document, in which various regions of interest have been segmented by class-specific masks.

At 102 processor of an image processing system will process the DM by applying the DM to a trained machine learning model that provides the function of a classifier semantically segments or classifies the image into various regions that are classified based on the feature classes that each region contains. With reference to FIG. 2, the regions (and associated feature classes) may include any or all of the following: a nipple region 201, a pectoralis region 202, a breast region 203, and a background or air region 204. Other regions that the system may identify include a region with tissue exhibiting density that is within a specified range, fatty tissue, implants, surgical scars, tissue folds, foreign objects such as feature markers or surgical clips, unintended body parts such as the nose, face or arm, or other charac- teristics. The output of the model will include a pixel mask for each region of interest, in which each pixel that includes the particular feature is assigned, for example, a grayscale value of 255 (or some other non-zero value) and each pixel that does not include the feature is assigned a zero grayscale value. Optionally, the assignment of zero and non-zero values may be reversed, so that the region of interest gets the zero value and the other areas get the 255 value. Alternatively, the pixel mask can have values that represent the probability of that pixel being part of a region such as the breast, pectoralis or nipple, for example. Thus, a probability mask can help identify the regions having the highest probability of showing a particular feature such as the breast, pectoralis or nipple. Additional encoding methods can also be envisioned and understood to be covered by these examples, by one skilled in the art.

Thus, the model may identify a first region in the image at 103, a second region in the image at 104, any number of additional regions (represented as $N^{th}$ region at 105), and/or the background region at 106 by generating a mask for some or all of the regions. The x-ray properties of the pectoralis muscle differ significantly from the remaining breast tissue; however, the presence of the pectoralis muscle in the image is necessary to ensure that the maximum amount of breast tissue is imaged. Thus, distinguishing the pectoralis region from other regions is especially beneficial, so in various embodiments at a minimum the system will distinguish the pectoralis region from other regions of the breast and/or other body parts. For example, first region 103 may be a pectoralis region, second region 104 may be a nipple region, and $N^{th}$ region 105 may be the region in which the entirety of the breast appears. (In this document, "entirety" means the full amount of the breast as appears in the image, including but not limited to any features that may overlap or be included within that region.) The system may identify the regions in a parallel process as shown, a sequential process, or a combination of the two.

At 107 the system will combine the masks that it generated to yield a combined mask, an example of which is shown as combined mask 201 in FIG. 2. To combine the masks, the system will assign a value for each pixel that is a function of the pixel values for each of the masks. For example, in FIG. 2, the system may assign a grayscale value of 255 to each pixel in the nipple region 201, a grayscale value of 190 to each pixel in the pectoralis region 202, a grayscale value of 128 to each pixel in the entire breast region 203 that is not also part of the nipple region 201, and a grayscale value of zero to each pixel in the background region 204. The process is not limited to these pixel values, and other values may be used to represent these or other regions. Alternatively, the combined mask could represent the probabilities of inclusion in multiple regions. Additional methods to combine the masks can also be envisioned and understood to be covered by these examples, by one skilled in the art.

Figure 4:
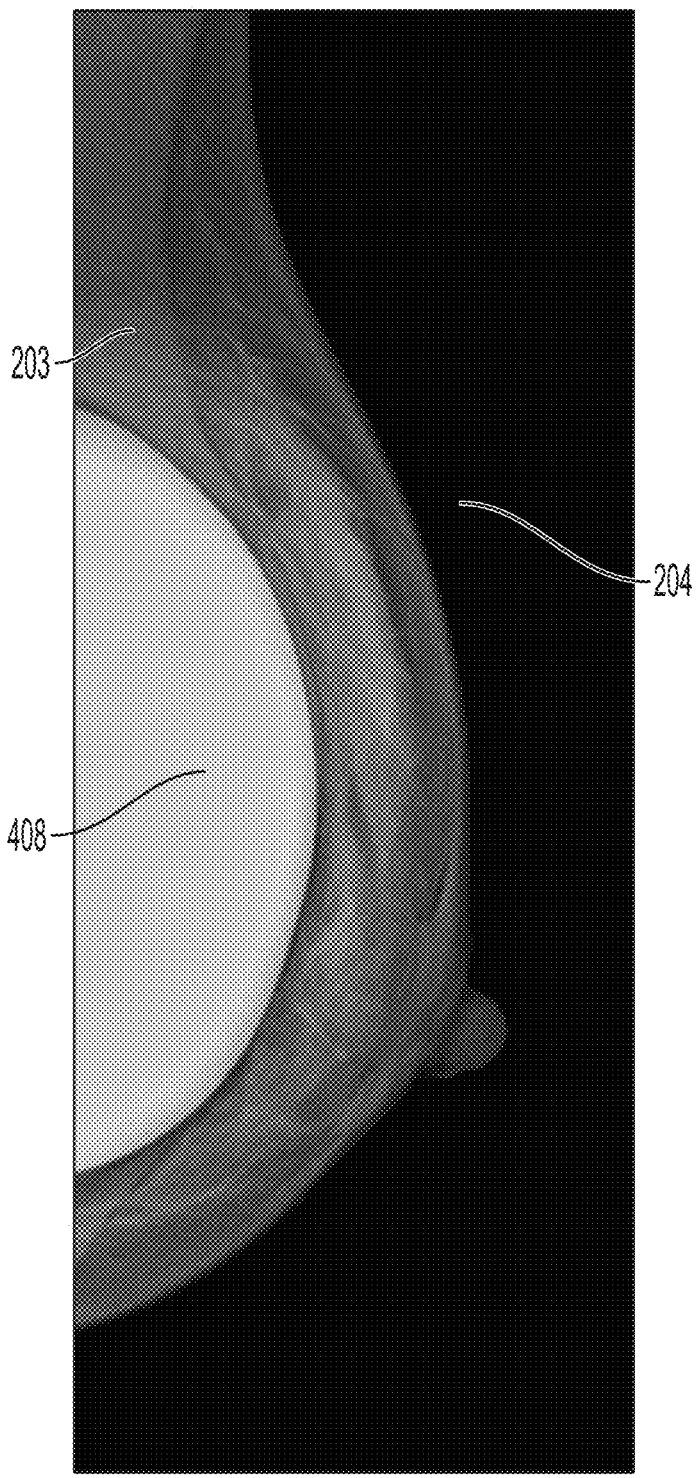
FIG. 4 illustrates an example mammographic image in which an implant is identified in the breast region.

Optionally, as shown in FIG. 4, if the model has been trained on at least some labeled images that include implant region labels, then when using the machine learning model to process the DM the system may generate an implant mask for an implant region 408 of the digital image in which an implant appears.

Optionally, if the model has been trained on at least some labeled images that contain other features, such as collimator blades, compression paddle arms, spot paddles, surgical clips or markers placed on the breast during imaging, then when using the machine learning model to process the DM, the system may generate a mask for the denoted region of the digital image in which the other features appear.

As noted above, when processing the digital image to generate the masks for each region of interest, the system will submit the image to a machine learning model that has been trained on a set of labeled images. Thus, as shown in FIG. 1, at 151 the system will receive a training set of labeled images, each of which includes region labels such as a pectoralis region label, a nipple region label, breast region label and/or a background region label. Some of the images also may include region labels for occlusions caused by other body parts such as nose, face, and arm, as well as other labelled objects such as a collimator blade, a compression paddle arm, a spot paddle, an implant, a surgical clip, a piercing or a pacemaker, if such parts or objects appear in the image. Region labels can be manually generated by a user and applied via software, automatically generated with software that is designed for automated labeling as is now or hereafter known in the art, or semi-automatically generated where the user identifies a region with software. At 152 the system will train the model on the labeled images. Optionally, the model that creates the masks can also be used to generate additional region labels with new images for additional training and testing.

The model may be a deep convolutional neural network (CNN) such as that known as U-Net, or another now or hereafter known semantic image segmentation network or model such as the models known as Fast Fully Convolutional Network (FastFCN), Gated-SCNN, and/or Mask R-CNN. U-Net takes advantage of a fully connected CNN by combining the usual contracting layers of a CNN with upsampling layers that allow for high-resolution features to be learned. The U-Net architecture includes a series of contracting and expanding blocks, and in various embodiments some or all of the available blocks may be used in this process. Thus, the U-Net architecture can help learn precise segmentation outputs while not requiring an onerous volume of training samples or model parameters. If the input is a 3D image, then the system may use the nn-Unet model or other 3D models known now or hereafter, which can process 3D data and/or stacks of images. Alternatively, the system may convert the 3D images to a stack of 2D images, and it may then generate a combined mask for some or all of the 2D images in the 3D stack. In addition, in tomosynthesis, the projection images can be processed separately as 2D images and then combined to create a 3D mask. Additional model methods can also be envisioned and understood to be covered by these examples, by one skilled in the art.

By way of example, the applicant in this case evaluated performance of a test set of DMs on a trained U-Net model by using the Sørensen-Dice coefficient to evaluate segmentation performance between the predicted multi-class mask and the annotated ground truths. The evaluation found an average Sørensen-Dice coefficient for all regions over all regions in the test set to be approximately 0.89, and a weighted average Sørensen-Dice coefficient of approximately 0.978 (with class weighting corresponding to the number of pixels in each class in each image).

Figure 3A:
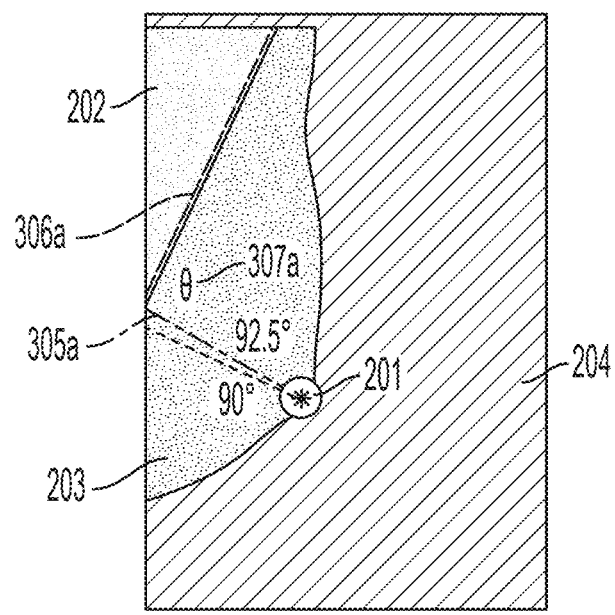
FIGS. 3A and 3B illustrate an example process of how the system may measure quality of breast placement in a digital image. The image of FIG. 3A is of satisfactory quality, while the image of FIG. 3B is not of satisfactory quality due to the angle θ being more than approximately 90 degrees.
Figure 3B:
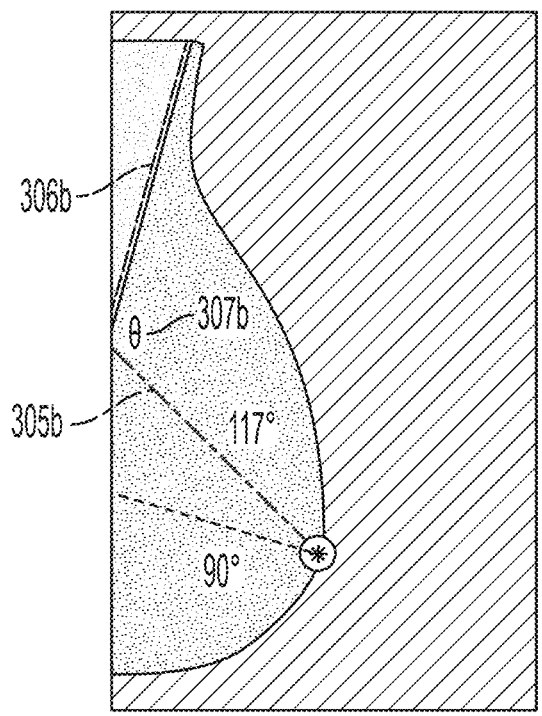

Once the system has generated a combined mask as described above, the system may use the individual probability masks and/or the combined mask to generate a measure of quality of the image at 109. One way by which the system may assess quality is to assess whether the breast was properly oriented in the combined mask image. FIGS. 3A and 3B illustrate a method by which the system may do this when the DM is an MLO-view mammogram. To do this, referring to FIG. 3A, the system may draw a line 305A from the nipple mask 201 to a nearest border point on a border 306a of the pectoralis mask 202. In reality, the border 306a is likely to be curved and not straight; if the actual border 306a is not straight, then the system may represent the border 306a by a straight line drawn between the end points of the actual border, or by a straight line that is fitted to the actual border curve. The system may then measure an angle 307a formed by the intersection of the line 305a with the line representing the border 306a. The system may then generate and report a measure of quality of the DM based on the measured angle 307a. In particular, the system may determine that the DM is of satisfactory quality if the angle 307a is 90 degrees or approximately 90 degrees; otherwise the system may determine that the DM is not of satisfactory quality. In this context, the term "approximately" may include any range up to +/−25%, such that "approximately 90 degrees" includes ranges including 67.5 to 112.5 degrees (+/−25%), along with any subrange within that range, such as but not limited to 81 to 99 degrees (+/−10%), 76.5 to 103.5 degrees (+/−15%), and 72 to 108 degrees (+/−20%).

The quality assessment also may consider the individual probability masks, as noted above. For example, if no mask of a particular region can be generated, or if the probability of a mask being associated with a particular region is below a threshold, then the system may determine that the image quality is low.

If the image quality measure is above the threshold (110: YES), then the system may classify the image as of acceptable quality at 111. If the image quality measure is below the threshold (110: NO), then the system may classify the image as of unacceptable quality, and it may optionally prompt a user or automatically cause an imaging device to re-take the image, at 112. In either situation, the system may save the image and its measure of quality for future reference, and/or for training the model.

FIG. 3A shows an image in which the angle 307a is approximately 90 degrees, and thus the system may report that the image is of satisfactory quality and the breast is properly oriented in the image. The system may therefore accept or indicate acceptance of this image at 111. However, in FIG. 3B the angle 307b formed by the intersection of the line 305b with the border 306b is not approximately 90 degrees. In FIG. 3B, the point on border 306b that would result in a 90 degree angle does not appear in the image. In this situation, the system may cause the imaging device to retake the image or output a prompt to the system user to retake the image at 112.

In addition to the perpendicular chestwall-to-nipple distance in the MLO, numerous other breast imaging quality assessment metrics can be calculated. The chestwall-to-nipple distance in other views (for example, the CC or ML view) can be calculated, together with the angle of the nipple from an ordinal point in the image, such as the center of the chestwall. The presence or absence of the pectoralis muscle and the shape of the pectoralis muscle, such as a measure of convexity, can be assessed. The area or volume of each segmented region can be assessed. Measurements based on the boundary, area, or volume of the masked regions can be computed, such as measures of the image texture or density within the masked region, for example. The presence of image findings, such as skin folds, arm in view, nose or face in view, foreign object in view, etc. can be assessed. The image quality of the implant in both implant in view, and displaced implant views can be assessed. Adequate coverage of the lower quadrant can be assessed. Visibility of the inframammary fold can be assessed. Additional image quality assessments, such as noise, contrast or resolution, can also be assessed. Other image measures can also be envisioned and understood to be covered by these examples, by one skilled in the art.

It is also expected that the measures described above can be communicated to the technologist as the image is being acquired or after image acquisition. Further, that the communication can be extended to the site manager, the radiologist or other parties including the device manufacturer. Further, these data, including the individual masks and the combined mask, can optionally be archived, recorded in a database or otherwise stored for analysis at 117, either immediately or in the future, individually or as an aggregate. These data can further be data-mined to identify trends in the data with time, by technologist, by machine, by site, etc.

Images captured and processed as described above may then be further processed for enhanced viewing and display, using methods such as those described in U.S. Pat. No. 8,233,690 to Ng et al.; U.S. Pat. No. 9,743,891 to Maidment et al.; and U.S. Pat. No. 10,593,069 to Ng et al., the disclosures of which are each fully incorporated into this document by reference. In addition, at 108 the system may use a combined mask image as a component of the image reconstruction or in image processing.

By segmenting the breast into regions, it is possible to apply different image processing or image reconstruction methods to each region. More attenuating regions or structures within the breast, such as the pectoralis muscle or a breast implant, can have a significant impact on the overall grayscale of the image during image processing or image reconstruction. This can result in a grayscale imbalance between images of the same study, for example the CC and the MLO images, because unlike the MLO the CC image does not have these large attenuating regions. Such a grayscale imbalance can make the images more challenging for the radiologist to read and diagnose. One way to balance the overall grayscales is to identify various regions through segmentation or classification, as disclosed above, and to process or reconstruct each region separately and then combine the processed regions. The combination may require blending of the grayscales between the regions to avoid possible discontinuities between regions that can cause artifacts, such as dark undershooting or ringing.

Regions of the breast can have different amount of signal and noise due to differences in thickness and x-ray attenuation. When processing each region, varying amounts of de-noising, edge enhancement or contrast enhancement can be applied to each region to balance the overall noise and signal within the breast.

Occlusions caused by highly attenuating objects in the image field of view, such as the nose, face, arm, metallic objects like surgical clips, piercings or pacemakers or collimator blades, compression paddle arms or spot paddles, can be identified through segmentation or classification, as disclosed above, and excluded from the main processing steps, so as to avoid imaging artifacts and any impact to the greyscale distribution of the more clinically relevant regions of the breast.

Thin regions of the breast, such as the nipple or skin line, are more x-ray absorbing than other parts of the breast and thus have higher pixel values. During image processing and image reconstruction, these regions will normally render darker than other regions making them more difficult or impossible to see by the radiologist. These regions can be enhanced to be more visible by scaling them in a grayscale range similar to the more attenuating regions, such as the breast parenchyma or pectoralis, and blending between the regions when combining. Similar processes can be envisioned for other segmentable or classifiable regions or objects to one skilled in the art.

Figure 5:
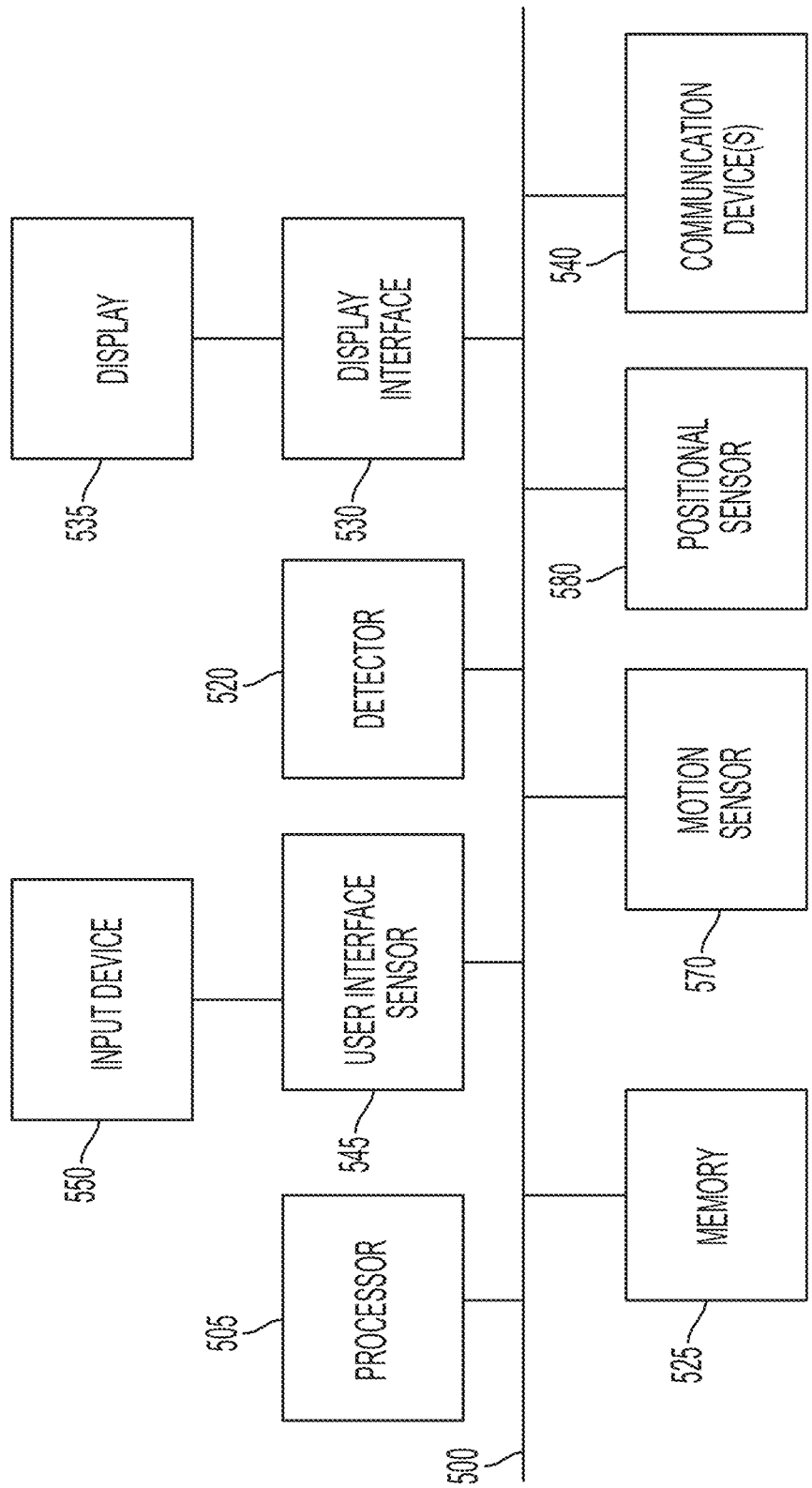
FIG. 5 illustrates example elements of an image processing system.

FIG. 5 depicts an example of internal hardware that may be included in any of the electronic components of the system, such as an imaging system or a computing device that processes digital images. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A GPU may be especially useful for the image processing steps of the processes described in this document. A memory device may include a single device or a collection of devices across which data and/or instructions are stored either locally or distributed across devices.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a wireless antenna, a radio frequency identification (RFID) tag and/or short-range or near-field communication transceiver, each of which may optionally communicatively connect with other components of the device via one or more communication systems. The communication device 540 may be configured to be communicatively connected to a communications network, such as the Internet, a local area network or a cellular telephone data network.

The hardware may also include a user interface sensor 545 that allows for receipt of data from input devices 550 such as a keyboard, a mouse, a joystick, a touchscreen, a touch pad, a remote control, a pointing device and/or microphone. Digital image frames also may be received from a detector or other imaging device 520 (such as those described above in step 101 of FIG. 1) that can capture an image sequence and/or still images. The system also may include a positional sensor 580 and/or motion sensor 570 to detect position and movement of the device. Examples of motion sensors 570 include gyroscopes or accelerometers. Examples of positional sensors 580 include a sensor that relates the angles of the x-ray source and the x-ray detector relative to the patient.

Figure 6:
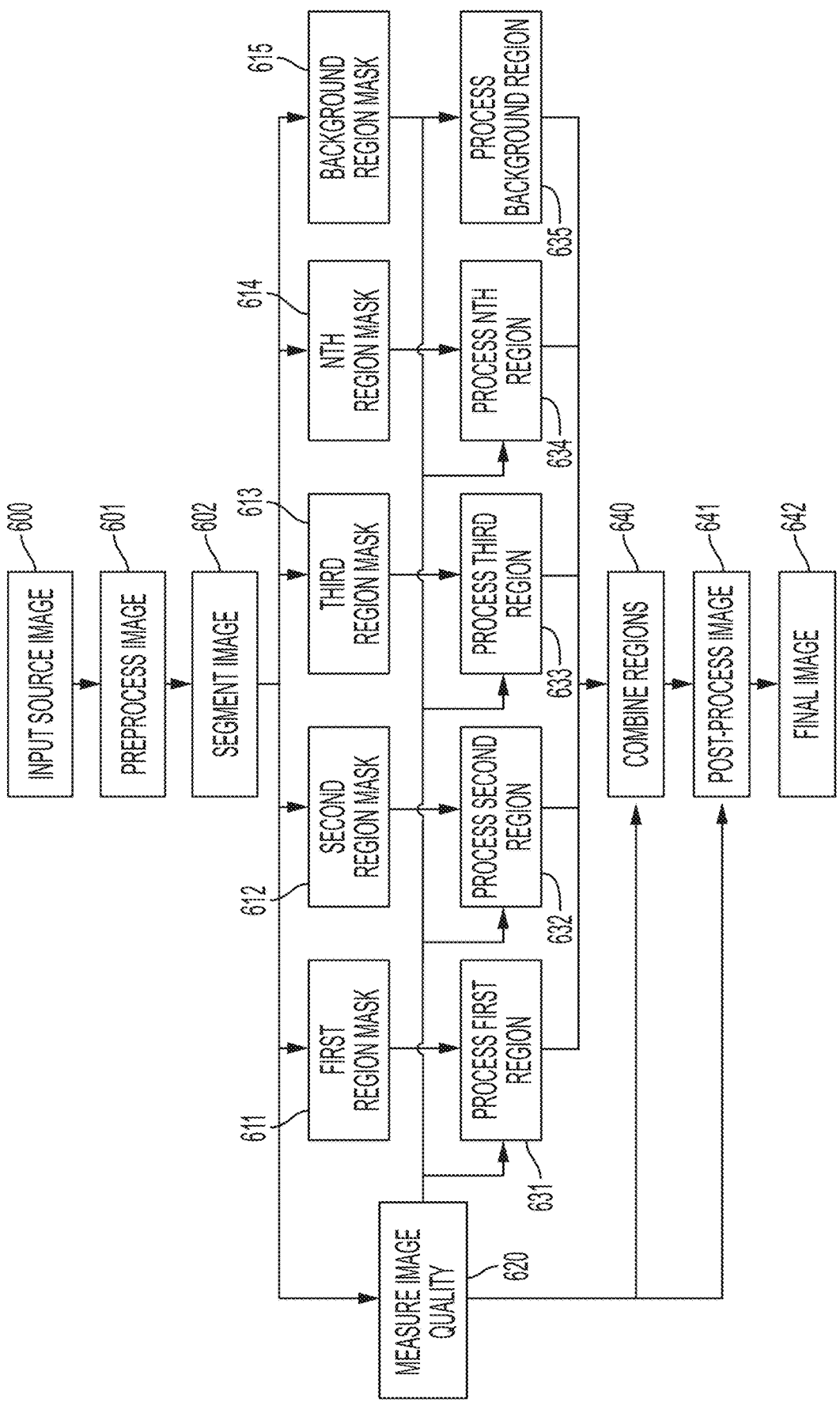
FIG. 6 illustrates an example process of how the system may use the segmentation or classification for image processing or image reconstruction.

FIG. 6 depicts an example of the process of image processing or reconstruction which includes image segmentation or classification, or quality metrics derived from these image regions. The image 600 may first be preprocessed 601, for example using contrast enhancement, spatial resolution conditioning, noise amelioration, or other similar methods familiar to one skilled in the art. Image segmentation 602 is performed to determine the breast region and at least one second region. For example, the image may be segmented into the a first region labeled as the breast region 611, a second region labeled as the pectoralis region 612, a third region labeled as the nipple region 613, and so forth up to the Nth region 614, as well as a background region 615. The breast region is then processed at 631, together with at least one of the additional regions. For example, the breast region may be processed 631, with the pectoralis 632, the nipple 633, and any or all of the other regions up to the Nth region 634 and the background region 635. Finally, the image regions are combined 640, and the combined image is post-processed 641 to yield the final image 642. Quality measures 620 derived from the segmentation 602, for example the area or the grayscale intensity of the breast region and the pectoralis region, may be used to further control or influence the image processing or the combination and subsequent post-processing steps. Additional image processing and reconstruction can also be envisioned and understood to be covered by these examples, by one skilled in the art.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the term "imaging device" refers generally to a hardware sensor that is configured to acquire digital images. An imaging device may capture still and/or video images, and optionally may be used for other imagery-related applications. For example, an imaging device can be a mammography device. The imaging device may be part of an image capturing system that includes other hardware components. For example, an imaging device can be mounted on an accessory such as a monopod or tripod.

In this document, the term "classifier" means an artificial intelligence system that is trained to may assign a label or category to one or more data points in an automated process. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have mis-classified. A classifier will be implemented by a processor executing programming instructions, and it may operate on large data sets such as image data and/or other data.

A "machine learning model" or a "model" refers to a set of algorithmic routines and parameters that can perform the function of a classifier and/or predict an output of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

The term "mask" refers to binary image consisting of zero and non-zero values. In any mask for a particular region of interest (such as a pectoralis, breast, or nipple), image pixels that correspond to the region of interest will be assigned one of the values (such as non-zero), while image pixels that do not correspond to the region of interest will be assigned the other value (such as zero). Masks can be combined such that unique values refer to different regions of interest (such as a combined mask that enumerates regions for the pectoralis, breast and nipple in a single image). A non-zero value may include any value of a range of values, with various values within the range indicating a measure of probability of a particular classification.

The term "database" means a structured set of data stored in one or more memory devices. A database generally organizes its data into fields, or associates the data with label, to assist in managing, updating and searching the data in the database. The term "data mining" refers to a process of extracting and discovering patterns in large data sets, using processes such as trained machine learning models.

As described above, this patent document discloses methods, systems that can perform the methods, and computer programs and computer program products that are configured to perform the methods, according to any or all of the following clauses. The systems include at least processor and a memory containing the computer program instructions. The systems also may include imaging devices as described above.

Clause 1: A method of automatically analyzing a digital breast image, the method comprising: receiving an image of a breast; using a machine learning model to process the image to generate a breast mask for an entire region of the image in which the breast appears; using the machine learning model to process the image to generate at least a second mask for a region of the image in which a feature other than the breast in its entirety appears; combining the breast mask and the second mask to yield a combined mask image; using the combined mask image to generate a measurement of quality of the received image; and generating and outputting a report that includes the measurement of quality.

Clause 2: The method of clause 1 further comprising, before processing the received image, training the machine learning model on a set of labeled images, wherein each of the labeled images includes a breast region label and another feature region label.

Clause 3: The method of clause 2, wherein each of the labeled images also includes a pectoralis region label, and the method further comprises: using the machine learning model to process the received image to generate a pectoralis mask for a region of the received image in which a pectoralis appears; and combining the pectoralis mask into the combined mask image.

Clause 4: The method of any preceding clause, wherein: (a) the at least a second mask includes a mask of a pectoralis muscle and mask of a nipple; (b) combining the breast mask and the second mask comprises combining the mask of the breast, the mask of the pectoralis muscle, and the mask of the nipple to yield the combined mask image; and (c) using the combined mask image to generate the measurement of quality comprises generating a line from the mask of the nipple to a nearest border point on a border of the mask of the pectoralis muscle, measuring an angle formed by the intersection of the line with the border, and generating the measurement of quality based on the measured angle Clause 5: The method of clause 2 or 3, wherein: the set of labeled images also includes an implant region label for a region of the received image in which an implant appears; and the method further comprises using the machine learning model to process the received image to generate an implant mask for the region of the received image in which the implant appears.

Clause 6: The method of clause 2, 3, or 5 wherein: the set of labeled images also includes a tissue density label; and using the machine learning model to process the received image to generate the second mask generates a mask for a region of the image in which tissue exhibiting a labeled density appears.

Clause 7: The method of clause 4, optionally combined with clause 2, 3, 5, or 6, further comprising generating the measure of quality based on the measured angle by determining that the received image is of satisfactory quality if the angle is approximately 90 degrees, otherwise determining that the image is not of satisfactory quality.

Clause 8: The method of any preceding clause, wherein the received image is one of the following: a mediolateral (ML) view; a mediolateral oblique (MLO) view; a true lateral view; a lateromedial (LM) view; a lateromedial oblique (LMO) view; a craniocaudal (CC) view; a magnification view; a two-dimensional (2D) source projection image of a three-dimensional (3D) tomosynthesis acquisition; a 2D projection image that is derived from a section of a 3D tomosynthesis image; or a synthetic 2D projection of a 3D tomosynthesis image.

Clause 9: A method of processing a digital breast image, the method comprising, by a processor: receiving an image of a breast; using a machine learning model to process the image to generate a breast mask for an entire region of the image in which the breast appears; using the machine learning model to process the image to generate at least a second mask for a region of the image in which a segment of the image other than the breast in its entirety appears; combining the breast mask and the second mask to yield a combined mask image; and using the combined mask image to generate a processed image that includes the combined mask image.

Clause 10: The method of clause 9, including any of the additional steps of clauses 1-8 above.

Clause 11: A method of reconstructing a digital breast image, the method comprising, by a processor: receiving an image of a breast; using a machine learning model to process the image to generate a breast mask for an entire region of the image in which the breast appears; using the machine learning model to process the image to generate at least a second mask for a region of the image in which a segment of the image other than the breast in its entirety appears; combining the breast mask and the second mask to yield a combined mask image; and using the combined mask image to generate a reconstruction that includes the combined mask image.

Clause 12: The method of clause 11, including any of the additional steps of clauses 1-8 above.

Clause 13: A system comprising a processor and a memory containing programming instructions that are configured to cause the processor to, upon receipt of an image of a breast, perform a method of any of clauses 1-12 above.

Clause 14: The system of clause 13, further comprising an imaging device that is configured to capture the received image.

Clause 15: The system of clause 14, wherein the imaging device comprises a full-field digital mammography (FFDM) system, a 3D tomosynthesis imaging system, a biopsy imaging system, a contrast-enhanced mammography (CEM) system, a magnetic resonance imaging (MRI) system, or an ultrasound system.

Clause 16: A computer program product comprising a memory containing programming instructions, or a computer program comprising such instructions, in which the instructions are configured to cause a processor to, upon receipt of an image of a breast, perform a method of any of clauses 1-12 above.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of automatically analyzing a digital breast image, the method comprising, by a processor:
receiving an image of a breast;
using a machine learning model to process the image to generate a breast mask for an entire region of the image in which the breast appears;
using the machine learning model to process the image to generate at least a second mask for a region of the image in which a feature other than the breast in its entirety appears;
combining the breast mask and the second mask to yield a combined mask image;
using the combined mask image to generate a measurement of quality of the received image by:
generating a line from the mask of the nipple to a nearest border point on a border of the mask of the pectoralis muscle,
measuring an angle formed between an orientation of the line and another line specifying the border of the mask of the pectoralis muscle, and
generating the measurement of quality based on the measured angle; and
generating and outputting a report that includes the measurement of quality.

2. The method of claim 1 further comprising, before processing the received image, training the machine learning model on a set of labeled images, wherein each of the labeled images includes a breast region label and another feature region label.

3. The method of claim 2, wherein:
each of the labeled images also includes a pectoralis region label; and
the method further comprises:
using the machine learning model to process the received image to generate a pectoralis mask for a region of the received image in which a pectoralis appears, and
combining the pectoralis mask into the combined mask image.

4. The method of claim 1, wherein:
the at least a second mask includes a mask of a pectoralis muscle and mask of a nipple; and
combining the breast mask and the second mask comprises combining the mask of the breast, the mask of the pectoralis muscle, and the mask of the nipple to yield the combined mask image.

5. The method of claim 2, wherein:
the set of labeled images also includes an implant region label for a region of the received image in which an implant appears; and
the method further comprises using the machine learning model to process the received image to generate an implant mask for the region of the received image in which the implant appears.

6. The method of claim 2, wherein:
the set of labeled images also includes a tissue density label; and
using the machine learning model to process the received image to generate the second mask generates a mask for a region of the image in which tissue exhibiting a labeled density appears.

7. The method of claim 1, further comprising generating the measure of quality based on the measured angle by determining that the received image is of satisfactory quality if the angle is approximately 90 degrees, otherwise determining that the image is not of satisfactory quality.

8. The method of claim 1, wherein the received image is one of the following:
a mediolateral (ML) view;
a mediolateral oblique (MLO) view;
a true lateral view;
a lateromedial (LM) view;
a lateromedial oblique (LMO) view;
a craniocaudal (CC) view;
a magnification view;
a two-dimensional (2D) source projection image of a three-dimensional (3D) tomosynthesis acquisition;
a 2D projection image that is derived from a section of a 3D tomosynthesis image; or
a synthetic 2D projection of a 3D tomosynthesis image.

9. A system comprising:
a processor; and
a memory containing programming instructions that are configured to cause the processor to, upon receipt of an image of a breast;
use a machine learning model to process the image to generate a breast mask for an entire region of the image in which the breast appears;
use the machine learning model to process the image to generate at least a second mask for a region of the image in which a feature other than the breast in its entirety appears;
combining the breast mask and the second mask to yield a combined mask image;
using the combined mask image to generate a measurement of quality of the received image by:
generating a line from the mask of the nipple to a nearest border point on a border of the mask of the pectoralis muscle,
measuring an angle formed between an orientation of the line and another line specifying the border of the mask of the pectoralis muscle, and
generating the measurement of quality based on the measured angle.

10. The system of claim 9, further comprising an imaging device that is configured to capture the received image.

11. The system of claim 10, wherein the imaging device comprises:
a full-field digital mammography (FFDM) system;
a 3D tomosynthesis imaging system;
a biopsy imaging system;
a contrast-enhanced mammography (CEM) system;
a magnetic resonance imaging (MRI) system; or
an ultrasound system.

12. The system of claim 9, further comprising programming instructions that are configured to cause the processor to, before processing the image, train the machine learning model on a set of labeled images, wherein each of the labeled images includes a breast region label and another feature region label.

13. The system of claim 9, wherein the instructions to generate at least the second mask comprise instructions to generate a pectoralis mask for a region of the received image in which a pectoralis appears.

14. The system of claim 9, in which the combined mask image is used to generate a measurement of quality, and wherein:
the instructions to generate at least the second mask comprise instructions to generate a mask of a pectoralis muscle and mask of a nipple; and
the instructions to generate the combined mask comprise instructions to combine the mask of the breast, the mask of the pectoralis muscle, and the mask of the nipple are combined to yield the combined mask image.

15. The system of claim 9, wherein the instructions to measure the quality based on the measured angle comprise instructions to determine that the received image is of satisfactory quality if the angle is approximately 90 degrees, otherwise determine that the received image is not of satisfactory quality.

16. The system of claim 9, wherein the instructions to generate at least the second mask comprise instructions to generate an implant mask for the region of the image in which the implant appears.

17. The system of claim 9, wherein the instructions to generate at least the second mask comprise instructions to generate a mask for a region of the image in which tissue exhibiting a labeled density appears.

18. A computer program product comprising a memory containing programming instructions that are configured to cause a processor to, upon receipt of an image of a breast:
use a machine learning model to process the image to generate a breast mask for an entire region of the image in which the breast appears;
use the machine learning model to process the image to generate at least a second mask for a region of the image in which a feature other than the breast in its entirety appears;
combining the breast mask and the second mask to yield a combined mask image;
using the combined mask image to generate a measurement of quality of the received image:
generate a line from the mask of the nipple to a nearest border point on a border of the mask of the pectoralis muscle,
measure an angle formed between an orientation of the line and another line specifying the border of the mask of the pectoralis muscle, and
generate the measurement of quality based on the measured angle.

19. A method of processing a digital breast image, the method comprising, by a processor:
receiving an image of a breast;
using a machine learning model to process the image to generate a breast mask for an entire region of the image in which the breast appears;
using the machine learning model to process the image to generate at least a second mask for a region of the image in which a segment of the image other than the breast in its entirety appears;
combining the breast mask and the second mask to yield a combined mask image; and
using the combined mask image to generate a processed image that includes the combined mask image and to generate a measurement of quality of the received image by:
generating a line from the mask of the nipple to a nearest border point on a border of the mask of the pectoralis muscle,
measuring an angle formed between an orientation of the line and another line specifying the border of the mask of the pectoralis muscle, and
generating the measurement of quality based on the measured angle.

20. A method of reconstructing a digital breast image, the method comprising, by a processor:
receiving an image of a breast;
using a machine learning model to process the image to generate a breast mask for an entire region of the image in which the breast appears;
using the machine learning model to process the image to generate at least a second mask for a region of the image in which a segment of the image other than the breast in its entirety appears;
combining the breast mask and the second mask to yield a combined mask image; and
using the combined mask image to generate a reconstruction that includes the combined mask image and to generate a measurement of quality of the received image by:
generating a line from the mask of the nipple to a nearest border point on a border of the mask of the pectoralis muscle,
measuring an angle formed between an orientation of the line and another line specifying the border of the mask of the pectoralis muscle, and
generating the measurement of quality based on the measured angle.

* * * * *